(12) United States Patent
Meursing et al.

(10) Patent No.: US 12,140,767 B2
(45) Date of Patent: *Nov. 12, 2024

(54) HEAD-MOUNTED DEVICE WITH OPTICAL MODULE ILLUMINATION SYSTEMS

(71) Applicant: Apple Inc., Cupertino, CA (US)

(72) Inventors: Marinus Meursing, Poway, CA (US); Keenan Molner, San Francisco, CA (US); Chengyi Yang, San Jose, CA (US); Florian R. Fournier, Cupertino, CA (US); Ivan S. Maric, Campbell, CA (US); Jason C. Sauers, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,901

(22) Filed: Oct. 17, 2023

(65) Prior Publication Data

US 2024/0061252 A1 Feb. 22, 2024

Related U.S. Application Data

(63) Continuation of application No. 17/174,168, filed on Feb. 11, 2021, now Pat. No. 11,828,944.

(60) Provisional application No. 63/007,572, filed on Apr. 9, 2020.

(51) Int. Cl.
| | | |
|---|---|---|
| *G02B 27/01* | (2006.01) | |
| *G02B 27/00* | (2006.01) | |
| *G09G 3/00* | (2006.01) | |
| *G09G 3/32* | (2016.01) | |

(52) U.S. Cl.
CPC ..... *G02B 27/0172* (2013.01); *G02B 27/0093* (2013.01); *G09G 3/32* (2013.01); *G02B 2027/0138* (2013.01); *G09G 2320/0626* (2013.01)

(58) Field of Classification Search
USPC .................................................. 345/7
See application file for complete search history.

(56) References Cited

U.S. PATENT DOCUMENTS

| | | |
|---|---|---|
| 8,929,589 B2 | 1/2015 | Publicover et al. |
| 9,244,170 B2 | 1/2016 | Blixt et al. |
| 9,924,864 B2 | 3/2018 | Hainzl et al. |

(Continued)

*Primary Examiner* — Chineyere D Wills-Burns
(74) *Attorney, Agent, or Firm* — Treyz Law Group, P.C.; G. Victor Treyz; Kendall P. Woodruff

(57) ABSTRACT

To accommodate variations in the interpupillary distances associated with different users, a head-mounted device may have left-eye and right-eye optical modules that move with respect to each other. Each optical module may have a display that creates an image and a corresponding lens that provides the image to an associated eye box for viewing by a user. The optical modules each include a lens barrel to which the display and lens of that optical module are mounted and a head-mounted optical module illumination system. The illumination system may have light-emitting devices such as light-emitting diodes that extend along some or all of a peripheral edge of the display. The light-emitting diodes may be mounted on a flexible printed circuit with a tail that extends a lens barrel opening. A stiffener for the flexible printed circuit may have openings that receive the light-emitting diodes.

20 Claims, 6 Drawing Sheets

(56) References Cited

U.S. PATENT DOCUMENTS

| | | | |
|---|---|---|---|
| 10,613,323 B1* | 4/2020 | Wheelwright | G02B 7/04 |
| 10,698,204 B1 | 6/2020 | Ouderkirk et al. | |
| 10,823,353 B1 | 11/2020 | Battaglia et al. | |
| 11,828,944 B1* | 11/2023 | Meursing | G02B 27/0172 |
| 2004/0137786 A1 | 7/2004 | Yu | |
| 2006/0153568 A1 | 7/2006 | Yoshida | |
| 2012/0206452 A1* | 8/2012 | Geisner | G06F 3/013 |
| | | | 345/419 |
| 2013/0114043 A1* | 5/2013 | Balan | H04N 13/344 |
| | | | 351/210 |
| 2014/0008778 A1* | 1/2014 | Zhang | H01S 5/02345 |
| | | | 257/676 |
| 2014/0097327 A1* | 4/2014 | Hung | G06F 3/0425 |
| | | | 250/578.1 |
| 2014/0285429 A1* | 9/2014 | Simmons | G02B 27/0179 |
| | | | 359/259 |
| 2014/0375680 A1* | 12/2014 | Ackerman | G02B 27/017 |
| | | | 345/633 |
| 2015/0185366 A1 | 7/2015 | Bone et al. | |
| 2016/0087117 A1 | 3/2016 | Heng et al. | |
| 2016/0306042 A1* | 10/2016 | Schrank | H01L 27/1443 |
| 2017/0017083 A1 | 1/2017 | Samec et al. | |
| 2017/0229059 A1 | 8/2017 | Bonnier et al. | |
| 2017/0351143 A1* | 12/2017 | Kadowaki | F21V 23/001 |
| 2018/0101229 A1 | 4/2018 | Vidal et al. | |
| 2018/0113508 A1* | 4/2018 | Berkner-Cieslicki | |
| | | | G06F 3/013 |
| 2018/0136491 A1* | 5/2018 | Ashwood | G02C 11/08 |
| 2018/0156960 A1* | 6/2018 | Tseng | G02F 1/133621 |
| 2019/0041644 A1 | 2/2019 | Abele et al. | |
| 2019/0282791 A1 | 9/2019 | Jones et al. | |
| 2020/0004023 A1 | 1/2020 | Shin et al. | |
| 2020/0012090 A1 | 1/2020 | Lapstun | |
| 2020/0012110 A1 | 1/2020 | Blum et al. | |
| 2020/0013228 A1 | 1/2020 | Lee et al. | |
| 2020/0020308 A1 | 1/2020 | Deering et al. | |
| 2020/0033560 A1 | 1/2020 | Weber et al. | |
| 2020/0110322 A1 | 4/2020 | Heintzelman et al. | |
| 2020/0219930 A1 | 7/2020 | Chen | |
| 2021/0272424 A1 | 9/2021 | Trudnak et al. | |
| 2021/0384175 A1 | 12/2021 | Dupont et al. | |

\* cited by examiner

HEAD-MOUNTED DEVICE WITH OPTICAL MODULE ILLUMINATION SYSTEMS This application is a continuation of patent application Ser. No. 17/174,168, filed Feb. 11, 2021, which claims the benefit of provisional patent application No. 63/007,572, filed Apr. 9, 2020, both of which are hereby incorporated by reference herein in their entireties.

FIELD

This relates generally to electronic devices, and, more particularly, to wearable electronic devices such as head-mounted devices.

BACKGROUND

Electronic devices such as head-mounted devices may have displays for displaying images. The displays may be housed in optical modules. A user may view the displayed images while a head-mounted device is being worn on the user's head.

SUMMARY

To accommodate variations in the interpupillary distances associated with different users, a head-mounted device may have left-eye and right-eye optical modules that move with respect to each other. Each optical module in a head-mounted device may have a display that creates an image and a corresponding lens that provides the image to an associated eye box for viewing by a user. The optical modules may each include a lens barrel in which the display and lens of that optical module are mounted. The optical modules may also each include a head-mounted device optical module illumination system.

The illumination system in each optical module may be used to create glints on a user's eye. One or more cameras in the optical module may monitor the glints to track the gaze of the user. The cameras may also measure the shape of a user's pupil while the eye box in which the pupil is located is illuminated by the illumination system. In some configurations, illumination may be provided from the illumination system while a camera captures biometric identification information such as iris information.

The illumination system of each optical module may have light sources operating at visible wavelengths, infrared wavelengths, and/or other wavelengths. The light sources may be, for example, infrared light-emitting diodes that extend along some or all of a peripheral edge of the display of the optical module. The light-emitting diodes may be mounted on a flexible printed circuit with a tail that extends a lens barrel opening. A gasket on the tail may help seal the opening.

A stiffener for the flexible printed circuit of each module may have openings that receive the light-emitting diodes. The stiffener may have a black anodized coating or other coating that helps suppress visible and/or infrared stray light reflections. Visible-light-blocking-and-infrared-light-transmitting encapsulant may be used to encapsulate the light-emitting diodes in the openings.

The light-emitting diodes may include a first set of light-emitting diodes that produce light at a first wavelength that serves as illumination while the camera gathers biometric information such as iris information. The light-emitting diodes may also include a second set of light-emitting diodes that produce light at a second wavelength that is longer than the first wavelength. The second set of light-emitting diodes may, for example, produce glint illumination and pupil illumination while the camera gathers glint information and pupil information for gaze tracking.

DETAILED DESCRIPTION

An electronic device such as a head-mounted device may have a front face that faces away from a user's head and may have an opposing rear face that faces the user's head. Optical modules on the rear face may be used to provide images to a user's eyes. To monitor the eyes of a user, the electronic device may be provided with eye monitoring components. These components may include, for example, cameras. An illumination system in each optical module may be used to provide light. The light may illuminate the user's eyes so that the cameras can capture images of the user's eyes. In an illustrative configuration, the illumination system of each optical module includes multiple discrete light sources such as light-emitting diodes. The light-emitting diodes may create glints on the user's eyes and can illuminate the user's pupils and irises. The cameras can then monitor the positions of the glints and/or the shapes of the user's pupils to determine the direction of gaze of the user. The cameras can also capture images of the user's irises (e.g., for biometric authentication).

Figure 1:
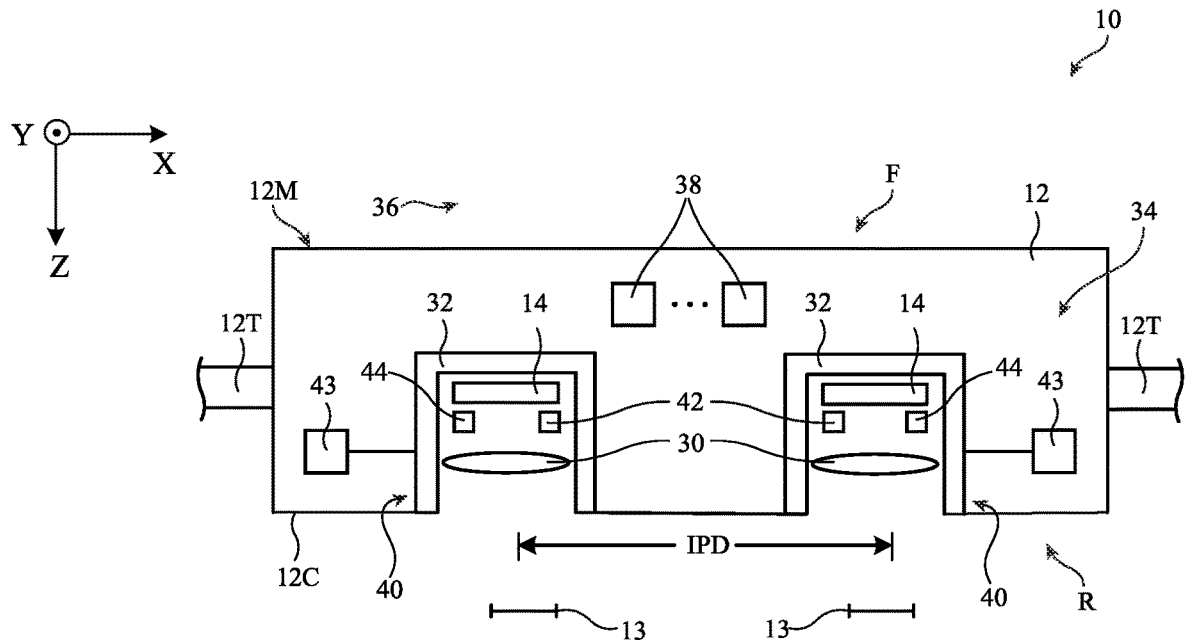
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 (e.g., lasers, lamps, etc.). Multiple cameras 42 may be provided in each optical module 40, if desired.

Cameras 42 and light-emitting diodes 44 may operate at any suitable wavelengths (visible, infrared, and/or ultraviolet). With an illustrative configuration, which may sometimes be described herein as an example, diodes 44 emit infrared light that is invisible (or nearly invisible) to the user. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with actuators 43. Actuators 43 can be manually controlled and/or computer-controlled actuators (e.g., computer-controlled motors) for moving support structures 32 relative to each other. Information on the locations of the user's eyes may be gathered using, for example, cameras 42. The locations of eye boxes 13 can then be adjusted accordingly.

Figure 2:
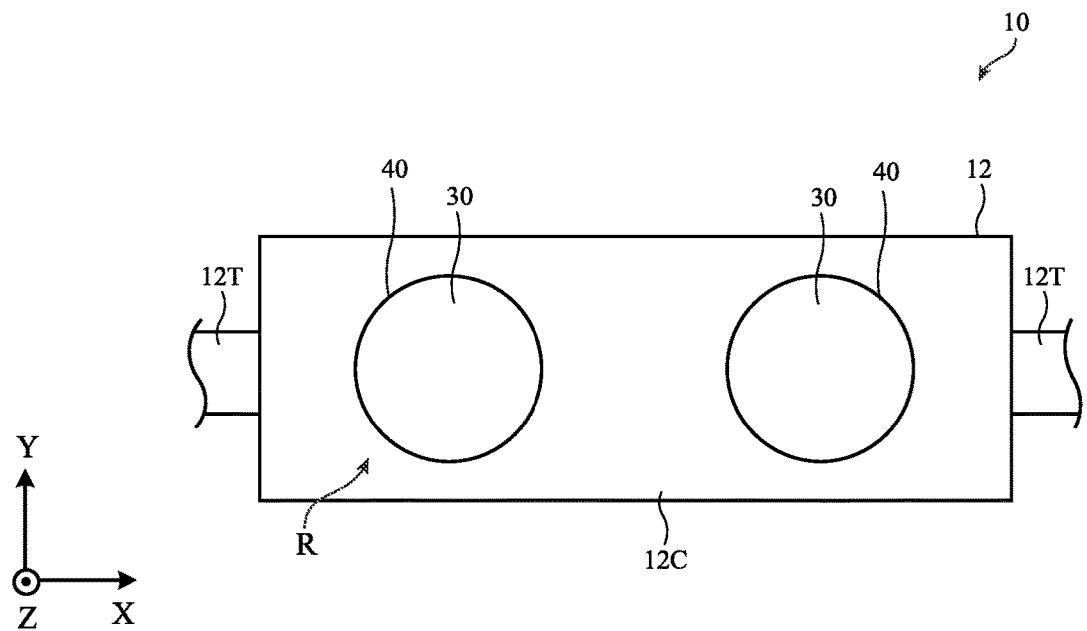
FIG. 2 is a rear view of an illustrative head-mounted device in accordance with an embodiment.

As shown in FIG. 2, cover 12C may cover rear face F while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
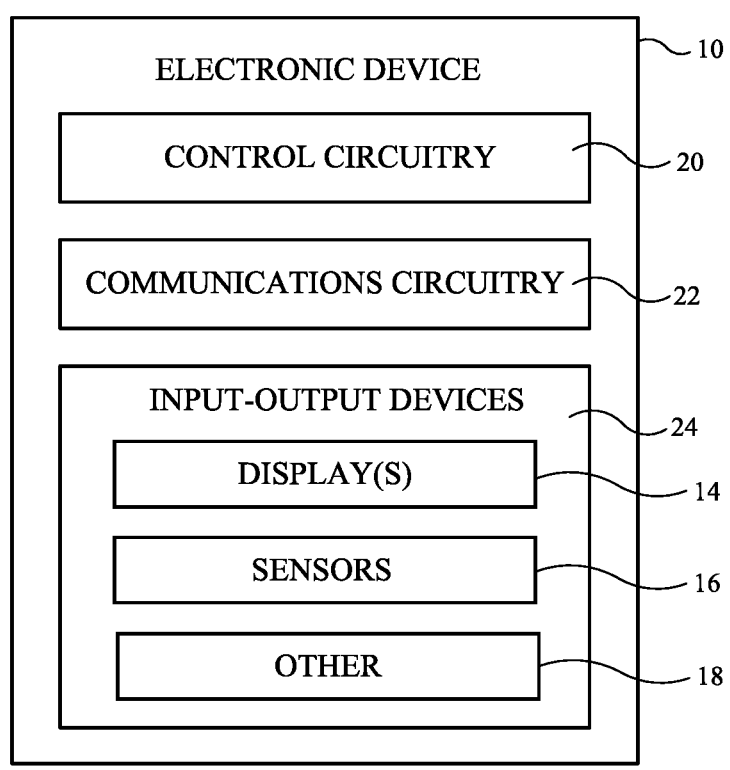
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
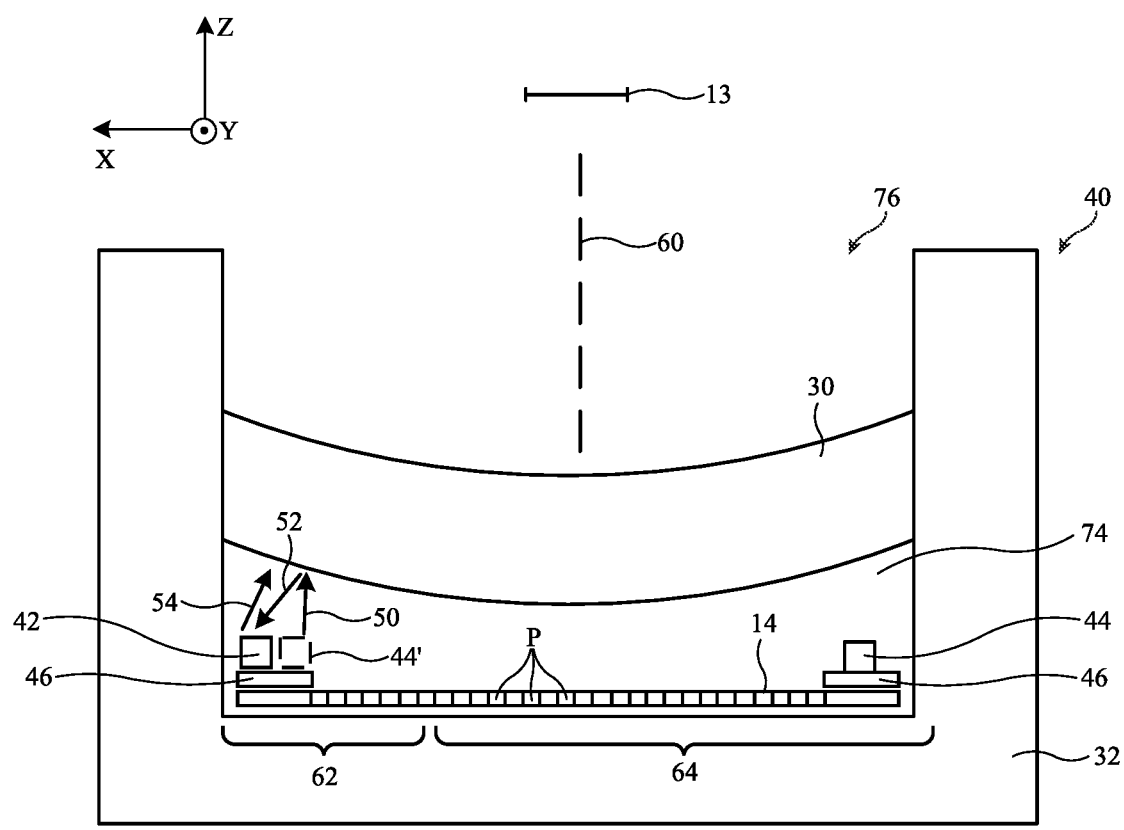
FIG. 4 is a cross-sectional side view of an illustrative optical module with an eye illumination system in accordance with an embodiment.

A cross-sectional side view of an illustrative optical module for device 10 is shown in FIG. 4. As shown in FIG. 4, optical module 40 may have lens barrel 32. Lens 30 may be used to provide an image from pixels P of display 14 to eye box 13 along optical axis 60. To provide eye illumination that illuminates an eye that is located in eye box 13, module 40 may contain one or more light sources (e.g., lasers, light-emitting diodes, lamps, etc.) such as light-emitting diodes 44. One or more cameras 42 may be included in each optical module 40 to monitor eye box 13. As shown in FIG. 4, for example, camera 42 may operate in direction 54 and may capture images of the user's eye while the user's eye is located in eye box 13.

Light-emitting diodes 44 may emit light at one or more wavelengths of interest (e.g., visible light wavelengths and/or infrared light wavelengths, etc.) and camera 42 may be sensitive at these wavelengths (e.g., visible light wavelengths and/or infrared light wavelengths, etc.). In an illustrative configuration, light-emitting diodes 44 emit infrared light. Infrared light may be used to illuminate the user's eye in eye box 13 while being unnoticeable (or nearly unnoticeable) to the user (e.g., because human vision is not generally sensitive to infrared light except when the infrared light has an infrared wavelength near the edge of the visible light spectrum, which extends from 380 to 740 nm).

Electronic components in module 40 such as display 14, camera 42, and light-emitting diodes 44 may be coupled to flexible printed circuits or other substrates containing metal traces. The metal traces may form interconnect paths that carry power signals, data signals, and control signals. As shown in FIG. 4, for example, light-emitting diodes 44 may be mounted on a ring-shaped substrate such as flexible printed circuit 46. Printed circuit 46 and light-emitting diodes 44 may extend around some or all of the inner periphery of lens barrel 32 (and therefore around some or all of the outer periphery of display 14).

During operation, light from light-emitting diodes 44 that are mounted along the edge of display 14 may travel to eye box 13 through lens 30. Light-emitting diodes 44 are generally out of the user's field of view or nearly out of the user's field of view as the user is viewing images presented by the array of pixels P on display 14. Some of light-emitting diodes 44 (e.g., N light-emitting diodes 44, where N is at least 3, at least 4, at least 5, at least 6, 3-9, less than 15, less than 10, less than 7, less than 6, or other suitable number) may create reflections off of the surface of the user's eye in eye box 13. These reflections, which may sometimes be referred to as glints, can be captured by camera 42. Device 10 can process glint information obtained by cameras 24 to track the user's gaze. For example, control circuitry 20 can analyze the positions of the glints to determine the shape of the user's eye (e.g., the user's cornea). From this information, control circuitry 20 can determine the direction of the user's gaze.

In addition to serving as glint light sources (e.g., light sources that produce glint illumination that is detected as discrete eye glints by camera 42), light from light-emitting diodes 44 may serve as blanket eye illumination. In particular, light from light-emitting diodes 44 may illuminate portions of each of the user's eyes such as the user's iris and the user's pupil.

During operation, camera 42 can capture an image of the user's pupil as the pupil is being illuminated by light from diodes 44. The user's pupil will have a shape (e.g., an oval shape) that varies depending on the orientation of the user's eye to camera 42. If, as an example, the eye is aligned with camera 42, the pupil will appear circular or nearly circular, whereas if the eye is angled away from camera 42, the pupil will have higher eccentricity. By analyzing the shape of the pupil, control circuitry 20 can determine the direction of the user's gaze.

It may also be desirable for camera 42 to capture other eye images such as images of the iris of the user's eye. Iris patterns are user-specific, so iris images may be used to authenticate users in device 10 (e.g., to log the user into a user account, to substitute for a username and/or password, or to otherwise serve as a biometric credential for device 10).

Pupil illumination and the illumination for the glints can be produced by light-emitting diodes 44 at the same wavelength or at different wavelengths. For example, pupil and glint illumination can be provided by light-emitting diodes 44 at a wavelength of 940 nm, 800-1000 nm, at least 800 nm, at least 850 nm, at least 900 nm, at least 950 nm, less than 950 nm, or other suitable wavelength. Configurations in which the wavelength of the glint and pupil illumination is sufficiently long to be invisible to most or all users may help allow glint and pupil measurements and/or other gaze tracking measurements to be taken continuously during operation of device 10, without potentially distracting users. Iris illumination may be provided by light-emitting diodes 44 at the same wavelength and/or a different wavelength than the glint illumination and the pupil illumination. To obtain desired image contrast when gathering iris information, it may be desirable for iris illumination to be provided at a shorter wavelength than the pupil and glint illumination (e.g., at a visible light wavelength and/or at a shorter infrared wavelength than used by diodes 44 when providing gaze tracking illumination). Camera 42 may include a single image sensor that captures pupil image data, glint image data, and iris image data, and/or multiple cameras may be provided each of which captures image data at a different wavelength (or band of wavelengths).

Consider, as an example, a scenario in which camera 42 is sensitive to infrared light over a range of wavelengths (e.g., one or more wavelengths between 780 nm and 1000 nm or other suitable wavelength range). Light-emitting diodes 44 may emit light at multiple wavelengths. For example, light-emitting diodes 44 may contain a first set of light-emitting diodes that produce illumination at a first wavelength (e.g., 850 nm, a wavelength between 780 and 870 nm, a wavelength of less than 900 nm, etc.) and may contain a separate second set of light-emitting diodes that produce illumination at a second wavelength (e.g., a second wavelength that is greater than the first wavelength such as a wavelength of 940 nm, at least 900 nm, 890-1000 nm, etc.). In this type of arrangement, the first set of light-emitting diodes may be used when device 10 is initially started up (e.g., to help camera 42 capture high-contrast iris images or other eye images for authentication), whereas the second set of light-emitting diodes may be operate later, during normal operation, to track the user's gaze. To avoid the possibility of the iris illumination being noticed by a user (e.g., a user who happens to be sensitive to near infrared light just past the edge of the visible light spectrum), the first set of light-emitting diodes may be turned off during normal operation. If desired, iris illumination may be provided in the visible light spectrum in addition to or instead of using infrared iris illumination.

It is possible that light from light-emitting diodes 44 can exhibit undesired reflections from the surface of lens 30 facing display 14. For example, if a light-emitting diode is located adjacent to camera 42, there is a possibility that an emitted light ray will follow path 50 to lens 30 and, upon directly reflecting from the surface of lens 30, will follow path 52 to camera 42. This direct reflection of the output of the light-emitting diode from the inner surface of lens 30 to camera 42 may be too strong and may overwhelm camera 42 and/or may otherwise interfere with the ability of camera 42 to capture a clear image of the glints on the user's eye and/or the user's pupil shape. To prevent this possibility, it may be desirable to mount light-emitting diodes 44 on flexible printed circuit 46 only in areas of barrel 32 such as region 64 that are located away from camera 42 and not in areas of barrel 32 such as region 62 that are adjacent to camera 42 (e.g., within 5 mm of camera 42, within 1 cm of camera 42, within 2 cm of camera 42, or within other suitable close distance to camera 42 that creates direct lens reflections detected by camera 42).

Figure 5:
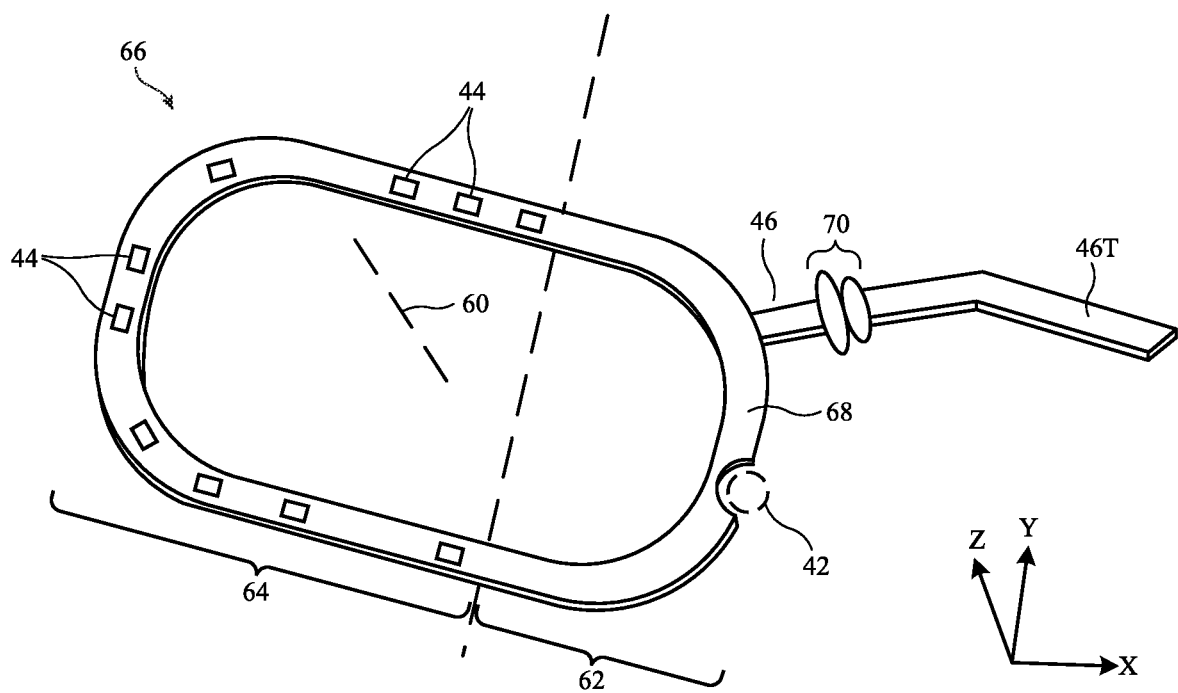
FIG. 5 is a perspective view of an illustrative eye illumination and sensing system in accordance with an embodiment.

FIG. 5 is a perspective view of an illustrative illumination system for optical module 40. As show in FIG. 5, light-emitting diodes 44 may be arranged in a ring (e.g., a full ring or partial ring such as a C-shaped ring) on a ring-shaped substrate such as flexible printed circuit 46. Flexible printed circuit 46 may, as an example, have an oval ring shape, a circular ring shape, a rectangular ring shape (e.g., with rounded corners), and/or other suitable ring shape. A stiffener such as stiffener 68 may be used to support flexible printed circuit 46. Stiffener 68 may overlap the ring-shaped portion of flexible printed circuit 46 and may surround optical axis 60. Light-emitting diodes 44 may protrude through respective openings in stiffener 68 and may provide illumination along axis 60 (e.g., in the +Z direction of FIG. 5). To prevent undesired back reflections from light-emitting diodes that are adjacent to camera 42, region 62 of flexible printed circuit 46 may be free of light-emitting diodes 44 (e.g., light-emitting diodes 44 may be mounted only in region 64, which is not immediately adjacent to camera 42).

Stiffener 68 may be formed from polymer, metal (e.g., aluminum), and/or other material. As an example, stiffener 68 may be a metal ring such as an aluminum ring. The width of stiffener 68 (in the X-Y plane of FIG. 5) may be 0.5-6 mm (as an example). The thickness of ring-shaped stiffener 68 and underlying light-emitting diode flexible printed circuit 46 may be about 0.2 to 0.8 mm.

Flexible printed circuit 46 may have a tail such as tail portion 46T that extends outwardly from the main ring-shaped portion of flexible printed circuit 46. Tail portion 46T and the remainder of flexible printed circuit 46 may include signal lines formed from metal traces. The signal lines may carry current to diodes 44. In an illustrative configuration, a first set of K diodes 44 emits light for gaze tracking illumination (e.g., pupil illumination and glint illumination) and a second set of M diodes 44 emits light for biometric identification illumination (e.g., iris scan illumination). The total number of diodes 44 on flexible printed circuit 46 (K+M) may be at least three, at least five, at least seven, at least nine, ten, at least 12, less than 20, less than 15, less than 13, less than 11, less than ten, less than eight, less than six, less than four, or other suitable number. The value of K may be at least one, at least two, at least three, at least five, at least seven, at least nine, ten, at least 12, less than 20, less than 15, less than 13, less than 11, less than ten, less than eight, less than six, less than four, less than three, or other suitable number. The value of M may be at least one, at least two, at least three, at least five, at least seven, at least nine, ten, at least 12, less than 20, less than 15, less than 13, less than 11, less than ten, less than eight, less than six, less than four, less than three, or other suitable number.

As shown in FIG. 4, lens barrel 32 may have a sealed interior region such as region 74 between lens 30 and the walls of barrel 32. The cavity formed by lens 30 and the wall(s) of lens barrel 32 separates interior region 74 from exterior region 76 and helps prevent environmental contamination such as dust and/or moisture in region 76 from intruding into region 74. To ensure that the interior region is sealed, it may be desirable to provide flexible printed circuits in module 40 with gaskets. For example, flexible printed circuit 46 may have a gasket such as gasket 70. Gasket 70 may be overmolded on tail portion 46T.

Figure 6:
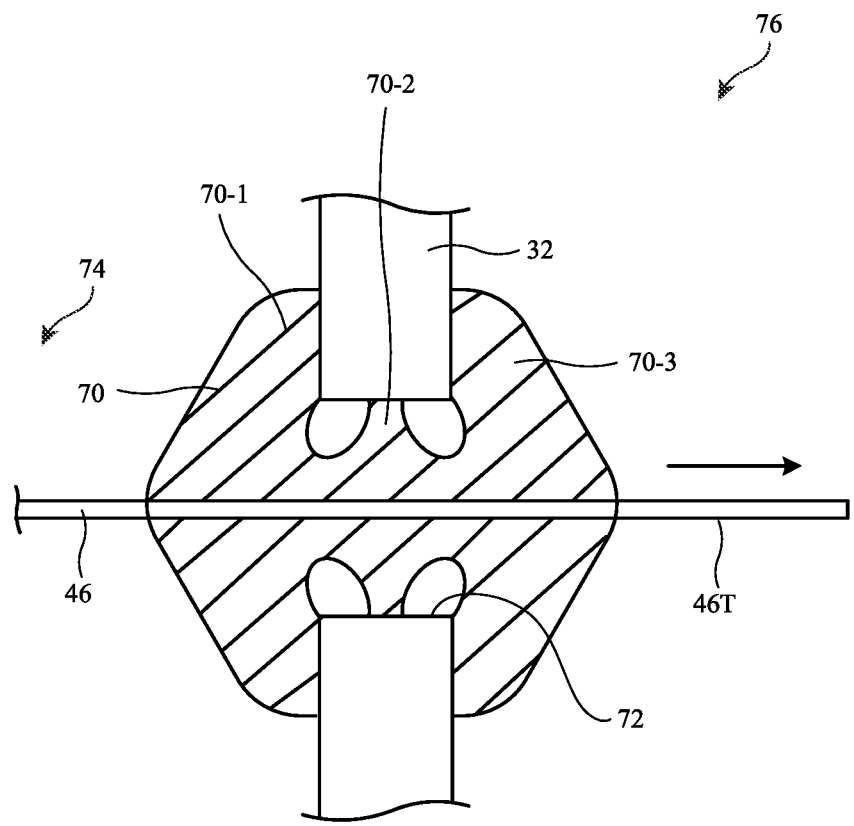
FIG. 6 is a side view of a portion of a lens barrel in an optical module showing how a tail portion of a flexible printed circuit in an illumination system may be provided with a gasket that seals an opening in the lens barrel in accordance with an embodiment.

Gasket 70 may seal an opening in barrel 32 through which flexible printed circuit tail 46T passes. Consider, as an example, the cross-sectional side view of the portion of lens barrel 32 that is shown in FIG. 6. When installing flexible printed circuit 46 in optical module 40, tail portion 46T of flexible printed circuit 46 may be pulled outwardly from interior region 74 to exterior region 76 through opening 72 in the wall of lens barrel 32. Gasket 70 may be formed from an elastomeric material such as silicone or thermoplastic polyurethane (as examples). As gasket 70 is drawn into opening 72, gasket 70 is squeezed to fit through opening 72. When installation of gasket 70 is complete, outer gasket disks 70-1 and 70-3 oppose each other on opposing wall surfaces of barrel 32 and inner gasket disk 70-2 presses outwardly against the inner surface of opening 72 to help form a seal.

Figure 7:
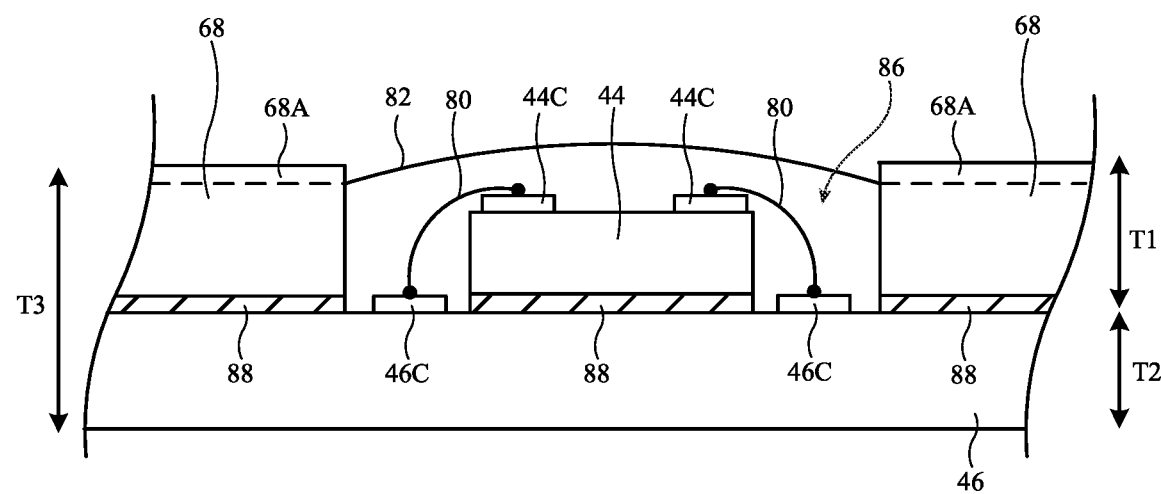
FIG. 7 is a side view of a portion of an illustrative illumination system in accordance with an embodiment.

FIG. 7 is a cross-sectional side view of an illustrative optical module illumination system (sometimes referred to as an eye illumination system, eye box illumination system, head-mounted device optical module eye illumination system, gaze tracking illumination system, etc.). As shown in FIG. 7, light-emitting diodes such as diode 44 and stiffener 68 may be coupled to flexible printed circuit 46 using a layer of adhesive 88. Metal traces in flexible printed circuit 46 form signal lines. These metal traces include contacts 46C. Contacts 46C may be electrically connected to corresponding metal traces on the semiconductor die forming light-emitting diode 44 (see, e.g., light-emitting diode contacts 44C) using wire bond connections 80. If desired, light-emitting diode 44 may be a packaged light-emitting diode. Arrangements such as the illustrative arrangement of FIG. 7 in which an unpackaged light-emitting diode die is mounted directly to flexible printed circuit 46 may help reduce the overall height (thickness) T3 of the illumination system assembly of FIG. 7. This may help ensure that the presence of light-emitting diode 44 at the periphery of display 14 (e.g., at the periphery of the active area of display 14 defined by the array of pixels P in display 14) does not block pixel light rays traveling to eye box 13. Thickness T3 may be reduced by reducing the thickness T1 of stiffener 68 and/or by reducing the thickness T2 of flexible printed circuit 46. In an illustrative configuration, thickness T1 is 0.05-0.15 mm and thickness of stiffener 68 is 0.2-0.6 mm.

Stiffener 68 may have a strip shape (e.g., a full or partial ring-shaped flat elongated member with a width larger than its thickness T1) and may have openings such as illustrative opening 86. Each light-emitting diode die on flexible printed circuit 46 may be received within a respective opening in stiffener 68 such as opening 86. Encapsulant 82 may cover diode 44 and fill opening 86. Encapsulant 82 may be a cured liquid polymer that is transparent at the wavelengths of light emitted by diode 44 (e.g., encapsulant 82 may be infrared transparent). To reduce the visibility of light-emitting diodes 44 and to prevent stray light reflections, encapsulant 82 may be opaque at visible light wavelengths (e.g., encapsulant 82 may be visible-light-blocking-and-infrared-light-transmitting encapsulant). Encapsulant 82 may, as an example, exhibit a transmission of at least 75% or at least 90% at infrared wavelengths associated with diode 44 while exhibiting a transmission of less than 25% or less than 10% at visible light wavelengths (e.g., from 380-780 nm).

Surfaces in the interior of optical modules 40 such as the surfaces of lens barrel 32, circuit 46, and stiffener 68 may be covered with coatings that absorb visible and infrared light. Such coatings, which may sometimes be referred to as dark coatings, low-reflectance coatings, opaque coatings, stray-light suppression coatings, or black coatings may be configured to reflect a low amount of light. For example, a black coating on lens barrel 32, printed circuit 46, or stiffener 68 may exhibit a reflectance at visible and/or infrared wavelengths of less than 25%, less than 15%, less than 10%, or less than 5%. Low-reflectance coatings may include black paint (e.g., polymer containing black dye and/or black pigment such as carbon black), black physical vapor deposition (PVD) coatings (e.g., a chromium carbide coating deposited by PVD, sometimes referred to as black PVD), and/or black anodized coatings.

As an example, stiffener 68 (and, if desired, the interior and/or exterior of lens barrel 32) may be provided with a dark coating layer such as coating 68A on stiffener 68 (and a corresponding coating on lens barrel 32) to help lower the visibility of stiffener 68 (and to help lower the visibility of lens barrel 32) and to prevent stray light reflections. In an illustrative configuration, stiffener 68 is formed from an anodizable metal such as aluminum and coating 68A is a black anodized coating (e.g., a coating that has a visible light reflectivity of less than 30%, less than 10%, or other suitable low reflectivity value and/or that has an infrared light reflectivity of less than 30%, less than 10%, less than 5%, or other suitable low reflectivity value). The coating may, for example, reflect a low amount of infrared light at the wavelengths emitted by the illumination system and a low amount of visible light. If desired, lens barrel 32 may be formed from an anodizable metal such as aluminum and the black anodized coating may be formed on the lens barrel. Stiffener 68, lens barrel 32, circuit 46, and/or other structures in optical module 40 may also be coated with other low-reflectance coatings (e.g., when the substrate material is not anodizable) such as black PVD coatings and/or black paint coatings (e.g., coatings with visible reflectance and/or infrared reflectance of less than 25%, less than 15%, less than 10%, or less than 5%, at visible light wavelengths and infrared wavelengths of less than 2 microns or less than 1 micron, as examples).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
 a head-mounted housing;

a lens barrel in the head-mounted housing;

a display coupled to the lens barrel;

a lens in the lens barrel that provides an image from the display to a corresponding eye box;

an illumination system configured to gather at least one of biometric information and gaze tracking information, wherein the illumination system comprises an array of light-emitting diodes in the lens barrel that extends around a periphery of the display.

2. The head-mounted device defined in claim 1 wherein the illumination system comprises a ring-shaped substrate on which the array of light-emitting diodes is mounted.

3. The head-mounted device defined in claim 2 wherein the ring-shaped substrate comprises a printed circuit substrate.

4. The head-mounted device defined in claim 3 further comprising a stiffener that overlaps the ring-shaped substrate.

5. The head-mounted device defined in claim 4 wherein the stiffener has openings through which light from the light-emitting diodes passes.

6. The head-mounted device defined in claim 3 wherein the printed circuit substrate has a tail portion that passes through an opening in the lens barrel.

7. The head-mounted device defined in claim 1 further comprising visible-light-blocking-and-infrared-light-transparent encapsulant covering the light-emitting diodes.

8. The head-mounted device defined in claim 1 further comprising a camera in the lens barrel configured to capture an eye image.

9. The head-mounted device defined in claim 8 wherein the light-emitting diodes include a first set of light-emitting diodes that operate at a first wavelength and a second set of light-emitting diodes that operate at a second wavelength that is longer than the first wavelength.

10. The head-mounted device defined in claim 9 wherein the second set of light-emitting diodes provides light that creates eye glints captured by the camera.

11. The head-mounted device defined in claim 10 wherein the first set of light-emitting diodes provides iris-illuminating light to the eye box.

12. The head-mounted device defined in claim 9 wherein the first wavelength is less than 900 nm and the second wavelength is at least 900 nm.

13. A head-mounted device, comprising:

a head-mounted housing;

first and second optical modules in the head-mounted housing, wherein each of the first and second optical modules includes a display that presents images and a lens through which the images are viewable from an eye box; and light-emitting diodes in the first and second optical modules that each form a ring around the display in the respective first and second optical modules.

14. The head-mounted device defined in claim 13 wherein the light-emitting diodes comprise a first set of light-emitting diodes that provides iris-illuminating light and a second set of light-emitting diodes that provides light that creates eye glints.

15. The head-mounted device defined in claim 14 further comprising a camera in each of the first and second optical modules that is configured to capture images of the eye glints.

16. The head-mounted device defined in claim 14 wherein the first set of light-emitting diodes operates at a first wavelength and the second set of light-emitting diodes operates at a second wavelength that is longer than the first wavelength.

17. A head-mounted device, comprising:

a head-mounted housing;

a lens barrel in the head-mounted housing that includes a display and a lens; and a gaze tracking system comprising an array of light-emitting diodes that extends around an inner periphery of the lens barrel.

18. The head-mounted device defined in claim 17 further comprising a ring-shaped printed circuit substrate on which the array of light-emitting diodes is mounted.

19. The head-mounted device defined in claim 18 further comprising a stiffener overlapping the ring-shaped printed circuit substrate and having openings through which light from the array of light-emitting diodes passes.

20. The head-mounted device defined in claim 18 wherein the ring-shaped printed circuit substrate has a tail portion that passes through an opening in the lens barrel.

* * * * *